(12) United States Patent
Sakamoto et al.

(10) Patent No.: US 11,814,521 B2
(45) Date of Patent: Nov. 14, 2023

(54) THERMALLY CONDUCTIVE POLYORGANOSILOXANE COMPOSITION

(71) Applicant: MOMENTIVE PERFORMANCE MATERIALS JAPAN LLC, Tokyo (JP)

(72) Inventors: Atsushi Sakamoto, Tokyo (JP); Isao Iida, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 31 days.

(21) Appl. No.: 17/357,690

(22) Filed: Jun. 24, 2021

(65) Prior Publication Data

US 2021/0317313 A1    Oct. 14, 2021

Related U.S. Application Data

(63) Continuation of application No. 16/618,077, filed as application No. PCT/JP2018/020986 on May 31, 2018, now abandoned.

(30) Foreign Application Priority Data

May 31, 2017 (JP) ................. 2017-107606

(51) Int. Cl.
```
C08L 83/04    (2006.01)
C08K 3/28     (2006.01)
C08K 3/013    (2018.01)
C08L 83/06    (2006.01)
C08G 77/12    (2006.01)
C08G 77/20    (2006.01)
```

(52) U.S. Cl.
CPC .............. *C08L 83/04* (2013.01); *C08K 3/013* (2018.01); *C08K 3/28* (2013.01); *C08L 83/06* (2013.01); *C08G 77/12* (2013.01); *C08G 77/20* (2013.01); *C08K 2003/282* (2013.01); *C08K 2201/001* (2013.01); *C08K 2201/003* (2013.01); *C08L 2203/206* (2013.01)

(58) Field of Classification Search
CPC ..................................................... C08L 83/04
See application file for complete search history.

(56) References Cited

U.S. PATENT DOCUMENTS

| | | | |
|---|---|---|---|
| 7,692,032 B2 | 4/2010 | Hoshino | |
| 2003/0229174 A1 | 12/2003 | Goto et al. | |
| 2007/0185259 A1 | 8/2007 | Hoshino | |
| 2010/0220446 A1* | 9/2010 | Tabei | H01L 23/3737 361/707 |

FOREIGN PATENT DOCUMENTS

| | | | |
|---|---|---|---|
| JP | S63256773 A | 10/1988 | |
| JP | H11222524 A | 8/1999 | |
| JP | H11222555 A | 8/1999 | |
| JP | 2002003831 A | 1/2002 | |
| JP | 2003213133 A | 7/2003 | |
| JP | 2009203373 A | 9/2009 | |
| JP | 2016084378 A | 5/2016 | |
| KR | 100729412 B1 * | 6/2007 | |
| WO | 2005030874 A1 | 4/2005 | |

OTHER PUBLICATIONS

Machine translation for KR 100729412 (no date).*
International Search Report (ISR) dated Jul. 3, 2018 (and English translation thereof), issued in International Application No. PCT/JP2018/020986.
Japanese Office Action dated Oct. 23, 2018 (and English translation thereof) issued in Japanese Patent Application No. 2018-529311.
Written Opinion of the International Searching Authority dated Jul. 3, 2018 issued in International Application No. PCT/JP2018/020986.

* cited by examiner

*Primary Examiner* — Marc S Zimmer
(74) *Attorney, Agent, or Firm* — Holtz, Holtz & Volek PC

(57) ABSTRACT

A thermally conductive polysiloxane composition comprising: (A) a thermally conductive filler; (B) a polyorganosiloxane resin having a curable functional group in the polysiloxane molecule, the polyorganosiloxane resin comprising at least one polysiloxane (b1) having one curable functional group in the molecule thereof; (C) a siloxane compound having an alkoxysilyl group and a linear siloxane structure; (D) a hydrogenpolyorganosiloxane; and (E) a platinum catalyst, wherein the content of the polysiloxane (b1) having one curable functional group in the molecule thereof in the polyorganosiloxane resin (B) is more than 80% by mass.

5 Claims, No Drawings

THERMALLY CONDUCTIVE POLYORGANOSILOXANE COMPOSITION

CROSS-REFERENCE TO RELATED APPLICATIONS

This application is a Continuation of U.S. application Ser. No. 16/618,077, filed Nov. 27, 2019, which is a National Phase Entry of Application No. PCT/JP2018/020986, filed May 31, 2018, which claims the benefit of Japanese Application No. 2017-107606, filed May 31, 2017, the entire contents of all of which are incorporated by reference herein.

FIELD OF THE INVENTION

The present invention relates to a thermally conductive polyorganosiloxane composition.

BACKGROUND ART

In electronic parts, such as a power transistor, an IC, and a CPU, for preventing accumulation of heat caused due to electrical heating elements, a thermally conductive grease and a thermally conductive sheet having high thermal conductivity are used. The thermally conductive grease has an advantage in that it can be applied with ease to electronic parts irrespective of the shapes of the electronic parts, but has problems, for example, in that the grease stains or breaks other parts and in that an oil component oozes out of the grease. The thermally conductive sheet does not stain or break other parts or cause an oil component to ooze; however, the sheet has poorer adhesion than the grease, and therefore, in order to improve the adhesion of the thermally conductive sheet, a method of reducing the hardness of the sheet is employed.

Silicone rubbers are widely used in the thermally conductive sheet. Silicone cannot enhance the thermal conductivity by itself and therefore, for improving the silicone rubber in thermal conductivity, a thermally conductive filler and the silicone rubber are used in combination. It has been known that, as a thermally conductive filler, a material having higher thermal conductivity than that of a silicone as a binder, such as a silica powder, alumina, boron nitride, aluminum nitride, or magnesium oxide, is added (Japanese Unexamined Patent Publication No. 2002-003831).

Electronic parts recently used and others likely generate heat in an increased amount as electronic devices have increasingly high output, and thus a radiator member having an even higher thermal conductivity is required. For obtaining a silicone composition having a high thermal conductivity for meeting the above demand, it is necessary to fill the composition with a thermally conductive filler at a higher filling ratio. However, the thermally conductive filler has a limitation of the filling property due to, for example, deterioration of the fluidity. Therefore, an improvement of the filling property by subjecting the thermally conductive filler to surface treatment has been known (Japanese Patent Application prior-to-examination Publication (saikohyo) No. 2005/030874).

PRIOR ART REFERENCES

Patent Documents

Patent document 1: Japanese Unexamined Patent Publication No. 2002-003831
Patent document 2: Japanese Patent Application prior-to-examination Publication (saikohyo) No. 2005/030874

SUMMARY OF THE INVENTION

Problems to be Solved by the Invention

The composition comprising a thermally conductive filler and a silicone is required to have a viscosity such that the composition is easy to handle when applying the composition to an electronic part, and required to have appropriate elastic properties after being cured for cushioning the electronic part. With respect to the composition which has been applied to an electronic part, meanwhile, the composition is required to be quickly cured. Especially when heat is needed for curing the composition, the composition is desired to have a high curing rate so as not to cause an adverse effect, such as deformation of an electronic part. However, a conventionally known composition is unsatisfactory in these physical properties. In view of the efficiency of the operations and prevention of an adverse effect on electronic parts, an improvement of the composition in viscosity/hardness and curing rate has been desired.

The present invention has been made for solving the problems, and an object of the present invention is to provide a thermally conductive polysiloxane composition which not only achieves appropriate viscosity/hardness and thermal conductivity but also exhibits excellent curing properties, particularly, excellent curing rate.

Means for Solving the Problems

The present inventors have conducted extensive and intensive studies with a view toward solving the above-mentioned problems. As a result, it has been found that, by adding a specific siloxane compound in a predetermined amount or more, the resultant thermally conductive polysiloxane composition can be improved in curing rate while maintaining the viscosity, hardness, and thermal conductivity, and the present invention has been completed.

The present invention is directed to the following items.

[1] A thermally conductive polysiloxane composition comprising:
(A) a thermally conductive filler;
(B) a polyorganosiloxane resin having a curable functional group in the polysiloxane molecule, wherein the polyorganosiloxane resin comprises at least one polysiloxane (b1) having one curable functional group in the molecule thereof;
(C) a siloxane compound having an alkoxysilyl group and a linear siloxane structure;
(D) a hydrogenpolyorganosiloxane; and
(E) a platinum catalyst,
wherein the content of the polysiloxane (b1) having one curable functional group in the molecule thereof in the polyorganosiloxane resin (B) is more than 80% by mass.

[2] The thermally conductive polysiloxane composition according to item [1] above, wherein the siloxane compound having an alkoxysilyl group and a linear siloxane structure is a siloxane compound represented by the following general formula (3):

[Chemical formula 1]

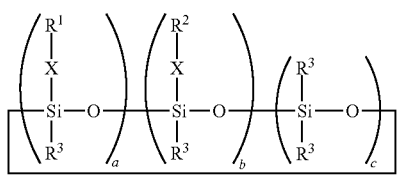
(3)

wherein:
R¹ is a group having an alkoxysilyl group having 1 to 4 carbon atoms;
R² is a linear organosiloxy group represented by the following general formula (4):

[Chemical formula 2]

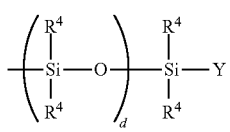
(4)

wherein each R⁴ is independently a monovalent hydrocarbon group having 1 to 12 carbon atoms, Y is a group selected from the group consisting of methyl, vinyl, and R¹, and d is an integer of 2 to 60;
each X is independently a divalent hydrocarbon group having 2 to 10 carbon atoms;
each of a and b is independently an integer of 1 or more;
c is an integer of 0 or more;
a+b+c is an integer of 4 or more; and
each R³ is independently a monovalent hydrocarbon group having 1 to 6 carbon atoms or a hydrogen atom.
[3] The thermally conductive polysiloxane composition according to item [1] or [2] above, wherein the curable functional group in the component (B) is a vinyl group.
[4] The thermally conductive polysiloxane composition according to item [3] above, wherein the mass ratio of the hydrogen directly bonded to silicon to the vinyl group contained in the composition (H/Vi ratio) is in the range of from 0.7 to 2.0.
[5] A cured product of the thermally conductive polysiloxane composition according to any one of items [1] to [4] above.
[6] An electronic part comprising the cured product according to item [5] above.

Effects of the Invention

By the present invention, there can be provided a thermally conductive polysiloxane composition which not only achieves appropriate viscosity/hardness and thermal conductivity but also exhibits excellent curing rate as well as excellent handling properties.

MODE FOR CARRYING OUT THE INVENTION

An embodiment of the present invention is a thermally conductive polysiloxane composition which comprises a thermally conductive filler, a polysiloxane resin comprising a predetermined amount or more of at least one siloxane having a curable functional group in the molecule thereof at one position, a siloxane compound as a surface treatment agent, a hydrogenpolysiloxane, and a platinum catalyst. Hereinbelow, the components contained in the composition of the present invention, the method for producing the composition and others will be described in detail.

[(A) Thermally Conductive Filler]

Examples of thermally conductive fillers include generally known inorganic fillers, such as aluminum oxide (alumina), magnesium oxide, zinc oxide, boron nitride, aluminum nitride, a silica powder, silicon carbide, a metal powder, diamond, aluminum hydroxide, and carbon. Especially preferred are alumina, zinc oxide, aluminum nitride, and silicon carbide. With respect to the inorganic filler, there is no particular limitation as long as it is of a grade that can be used as a thermally conductive filler, and those which are commercially available can be used. Further, a plurality of types of inorganic fillers of different chemical species can be used in combination.

With respect to the average particle diameter of the thermally conductive filler, there is no particular limitation as long as the thermally conductive filler is of a grade that can be used as a thermally conductive filler, but a thermally conductive filler having an average particle diameter of 300 μm or less is preferably used. With respect to the thermally conductive filler having an average particle diameter in the above range, when the thermally conductive filler having a larger average particle diameter is incorporated, the filling ratio cannot be increased. On the other hand, when the thermally conductive filler having a smaller average particle diameter is incorporated, the resultant composition tends to have an increased viscosity. By incorporating the thermally conductive filler having an appropriately selected average particle diameter, a composition having a viscosity suitable for the purpose can be obtained.

With respect to the thermally conductive filler, it is preferred that a filler having a relatively large particle diameter and a filler having a relatively small particle diameter are used in combination. By using a plurality of types of fillers having different particle diameters in combination, the filler having a relatively small particle diameter goes into voids caused in the filler having a relatively large particle diameter, enabling higher filling. According to the average particle diameter, the filler can be classified into a filler having a larger particle diameter, a filler having an intermediate particle diameter, and a filler having a smaller particle diameter. For example, the filler having a larger particle diameter has a particle diameter of 20 μm or more, preferably 30 μm or more, the filler having a smaller particle diameter has a particle diameter of less than 1 μm, and the filler having an intermediate particle diameter has a particle diameter which is between the above particle diameters. At least two or more types, particularly three types of the filler having a larger particle diameter, filler having an intermediate particle diameter, and filler having a smaller particle diameter are preferably used. When a plurality of types of fillers having different particle diameters are used, the proportion of the fillers incorporated can be arbitrary. However, from the viewpoint of the working properties of the preparation of the composition and the thermal conductivity of the obtained composition, the filler having a larger particle diameter is preferably used in an amount of 30 to 70% by mass, more preferably 35 to 65% by mass. When three types of fillers having a larger particle diameter, an intermediate particle diameter, and a smaller particle diameter are used, the ratio of the incorporated filler having an intermediate particle diameter and filler having a smaller particle diameter is preferably in the range of from 1:40 to 40:1, more preferably in the range of from 1:7 to 7:1.

With respect to the shape of the inorganic particles used as the thermally conductive filler, there is no particular limitation. For example, any of particles of a spherical shape, particles of a rounded shape, and particles of an indefinite shape can be used, and further at least two or more types of these particles can be used in combination. In the case where the inorganic particles have a rounded shape or an indefinite shape, the average particle diameter of the inorganic particles is defined by a method known to those skilled in the art. The average particle diameter can be determined as, for example, a weight average value (or a median diameter) using a particle size distribution measurement apparatus by, for example, a laser light diffraction method.

The amount of the filler incorporated into the thermally conductive polysiloxane resin is in the range of from 10 to 5,000 parts by mass, relative to 100 parts by mass of the total of the siloxane compound and the polysiloxane resin having a curable functional group. When the amount of the filler is preferably in the range of from 50 to 4,000 parts by mass, more preferably 100 to 3,000 parts by mass, the effects of the present invention are remarkably exhibited.

[(B) Polyorganosiloxane Resin]

The thermally conductive polysiloxane composition of the present invention contains polyorganosiloxane resin (B) having a curable functional group in the polysiloxane molecule, wherein the polyorganosiloxane resin comprises at least one siloxane (b1) having one curable functional group in the molecule thereof. With respect to the type of the curable functional group, there is no particular limitation as long as it is a functional group which is capable of taking part in a curing reaction of a resin, but preferred is an aliphatic unsaturated group which undergoes curing due to an addition reaction, such as (a)an (meth)acryl group or a vinyl group, and more preferred is a vinyl group. With respect to the mechanism of the curing reaction, there is no particular limitation, and a method generally used in curing a resin can be employed, but preferred is curing by an addition reaction.

In polyorganosiloxane resin (B), the amount of polyorganosiloxane (b1) having one curable functional group in the molecule thereof contained in the polyorganosiloxane resin having a curable functional group in the polysiloxane molecule is more than 80% by mass. When the content of polysiloxane (b1) is in this range, the resultant thermally conductive polysiloxane composition exhibits high curing rate. The content of polysiloxane (b1) in component (B) is preferably 85 to 99% by mass.

With respect to the type of polyorganosiloxane (b1) having one curable functional group in the molecule thereof, there is no particular limitation, and any polyorganosiloxane having a curable functional group at one position of the molecule thereof can be used, irrespective of whether the position of the curable functional group is an end of the molecule or an inside of the molecule. One type of polyorganosiloxane may be individually used, and two or more different types of polyorganosiloxanes may be used in combination. As an example of polyorganosiloxane (b1) having one curable functional group in the molecule thereof, there can be mentioned a linear polyorganosiloxane having an aliphatic unsaturated group at a molecular end thereof and being represented by the following general formula (1):

[Chemical formula 3]

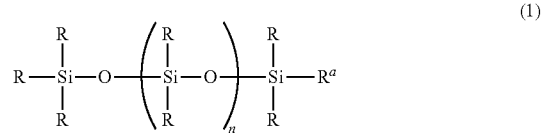

wherein:
- $R^a$ is an aliphatic unsaturated group,
- each R is independently a $C_{1-6}$ alkyl group or a $C_{6-12}$ aryl group, and
- n is the number that satisfies the viscosity of 0.01 to 50 Pa·s at 23° C.,
- but the polyorganosiloxane is not limited to the resin having the above structure. From the viewpoint of easy availability or preparation, the linear siloxane of the formula (1) wherein $R^a$ is a vinyl group and each R is methyl is preferably used.

In polyorganosiloxane resin (B), for curing the composition, in addition to the above-mentioned component (b1), a polysiloxane resin having two or more curable functional groups is contained. The type of the curable functional group of this polysiloxane resin is similar to that of component (b1), but the curable functional group of the polysiloxane resin is preferably the same as the curable functional group of component (b1). As one mode of the polysiloxane resin having two or more curable functional groups, there can be mentioned a linear polyorganosiloxane containing an aliphatic unsaturated group at both ends thereof and being represented by the following general formula (2):

[Chemical formula 4]

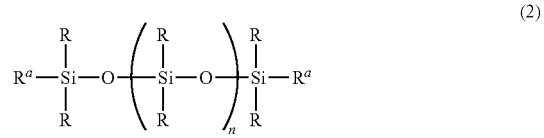

wherein:
- each $R^a$ is independently an aliphatic unsaturated group,
- each R is independently a $C_{1-6}$ alkyl group or a $C_{6-12}$ aryl group, and
- n is the number that satisfies the viscosity of 0.01 to 50 Pa·s at 23° C.,
- but the polyorganosiloxane resin is not limited to the resin having the above structure. Of the linear polyorganosiloxanes represented by the general formula (2) above, the polyorganosiloxane of the formula (2) wherein all R's are methyl and $R^a$ is a vinyl group is preferably used because of easy availability.

The amount of the incorporated polyorganosiloxane resin (B) (whole of component (B)) is preferably in the range of from 3 to 30 parts by mass, more preferably in the range of from 3 to 10 parts by mass, relative to 100 parts by mass of the thermally conductive filler. When the amount of the polyorganosiloxane resin is in the above range, the resultant composition can exhibit a high curing rate without sacrificing the high thermal conductivity of the thermally conductive filler.

[(C) Siloxane Compound]

In the thermally conductive polysiloxane composition of the present invention, a siloxane compound having (i) an alkoxysilyl group and (ii) a linear siloxane structure is contained as a surface treatment agent.

With respect to the molecular structure of the siloxane compound as a surface treatment agent, there is no particular limitation as long as it has the structure indicated by (i) and (ii) above, and any of linear, branched, and cyclic siloxane compounds can be used. As a preferred example of the siloxane compound, there can be mentioned a siloxane compound represented by the following general formula (3):

[Chemical formula 5]

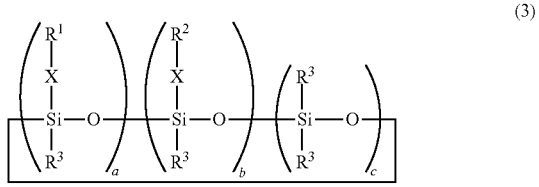

(3)

wherein $R^1$, $R^2$, $R^3$, X, a, b, and c are as defined above.

In the siloxane compound, the unit containing $R^1$, the unit containing $R^2$, and the unit represented by $SiR^3_2O$ are not necessarily arranged as shown in the general formula (3) above, and it is understood that, for example, the unit represented by $SiR^3_2O$ may be present between the unit containing $R^1$ and the unit containing $R^2$.

The siloxane compound having the cyclic structure represented by the general formula (3) can have introduced a large number of hydrolyzable groups into the cyclic structure, and further has the hydrolyzable groups concentrated in the position of the structure, and therefore is considered to have an increased treatment efficiency for a thermally conductive filler, enabling higher filling. In addition, the siloxane compound per se has high heat resistance, and therefore can cause the thermally conductive polysiloxane composition to have high heat resistance. Further, such a siloxane compound has an advantage in that the compound can be easily obtained by, for example, subjecting to addition reaction a cyclic siloxane containing a hydrogen group, a siloxane having a vinyl group at one end thereof, and a silane compound containing a vinyl group and a hydrolyzable group.

In the general formula (3), $R^1$ is a hydrolyzable functional group containing an alkoxysilyl group having 1 to 4 carbon atoms, and, as more specific examples, there can be mentioned groups having the structures shown below. $R^1$ may be directly bonded to X with silicon, but may be bonded to X through a linking group, such as an ester linkage. More specific examples of $R^1$'s include groups having the structures shown below.

[Chemical formula 6]

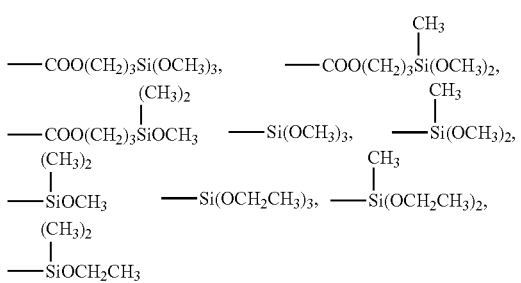

Especially, in view of a tendency toward a further improvement of the treatment efficiency for the thermally conductive filler, $R^1$ is preferably a group of a structure having two or more alkoxysilyl groups, especially having three alkoxysilyl groups. Further, in view of easy availability of the raw material, $R^1$ preferably contains a methoxysilyl group.

$R^2$ is selected from the group consisting of an oligosiloxane and a long-chain alkyl group. When $R^2$ is a long-chain alkyl group, the long-chain alkyl group has 6 to 18 carbon atoms, preferably 6 to 14 carbon atoms. The term "long-chain alkyl group" means an alkyl group of which the longest carbon chain portion has 6 or more carbon atoms, and which may have a branched structure as long as the total number of carbon atoms is within the above range. When the number of carbon atoms of the alkyl group is in the above range, the effect on the fluidity is improved, enabling high incorporation. Further, excellent handling properties are achieved, facilitating uniform dispersion.

When $R^2$ is an oligosiloxane, $R^2$ is a group represented by the following general formula (4):

[Chemical formula 7]

(4)

wherein $R^4$, Y, and d are as defined above.

In the general formula (4), d is a number in the range of from 2 to 500, preferably in the range of from 4 to 400, more preferably in the range of from 10 to 200, especially preferably in the range of from 10 to 60. When d is in the above range, the effect on the fluidity is improved, enabling high incorporation, so that the viscosity of the siloxane compound per se can be reduced. Each $R^4$ is independently a monovalent hydrocarbon group having 1 to 12 carbon atoms, and examples of $R^4$'s include linear or branched $C_{1-12}$ alkyl groups, and aryl groups, such as phenyl and naphthyl. $R^4$ may be substituted with a halogen, such as chlorine, fluorine, or bromine, and examples of such groups include perfluoroalkyl groups, such as a trifluoromethyl group. In view of easy synthesis of the compound, $R^4$ is preferably a methyl group. Y is a group selected from the group consisting of $R^1$, $R^4$, and an aliphatic unsaturated group. The aliphatic unsaturated group preferably has 2 to 10 carbon atoms, more preferably has 2 to 6 carbon atoms. The aliphatic unsaturated group preferably has a double bond at an end because a curing reaction can be easily undergone. In view of easy synthesis of the compound, Y is preferably a methyl group or a vinyl group. $R^2$ is preferably the above-mentioned oligosiloxane because it is likely that the resultant siloxane compound enhances the affinity with the thermally conductive filler through the base polymer, so that a composition having excellent handling properties, for example, having a reduced viscosity can be obtained.

$R^1$ and $R^2$ are individually bonded through group X to the cyclic siloxane portion of the siloxane represented by the general formula (3). Group X is a divalent hydrocarbon group having 2 to 10 carbon atoms, and examples of such groups include alkylene groups, such as —$CH_2CH_2$—, —$CH_2CH_2CH_2$—, —$CH_2CH_2CH_2CH_2CH_2$—, —$CH_2CH(CH_3)$—, and —$CH_2CH(CH_3)CH_2$—. In view of easy synthesis of the compound, X is preferably —CH$_2$CH$_2$— or —CH$_2$CH(CH$_3$)—.

Each R$^3$ is independently a monovalent hydrocarbon group having 1 to 6 carbon atoms or a hydrogen atom. R$^3$'s may be the same or different. In view of easy synthesis of the compound, R$^3$ is preferably a methyl group or a hydrogen atom.

a is an integer of 1 or more, preferably 1. b is an integer of 1 or more, preferably 1 or 2. c is an integer of 0 or more, preferably 0 to 2, more preferably 1 or 2. Further, the total of a+b+c is an integer of 4 or more, and is preferably 4 in view of easy synthesis of the compound. When b is 2, R$^2$ is preferably selected so that the number of the units represented by —SiR$^4_2$O— becomes 10 to 60 in total from the viewpoint of the handling properties.

As representative examples of the above-described siloxane compounds, there can be mentioned compounds represented by the structural formulae shown below, but the present invention is not limited to these compounds.

[Chemical formula 8]

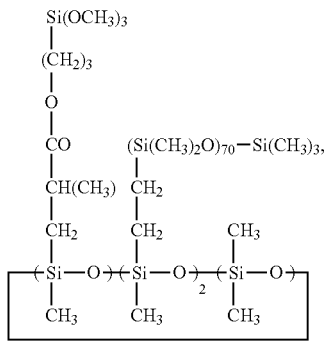
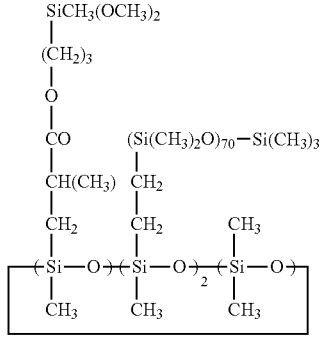
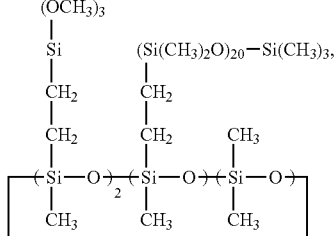
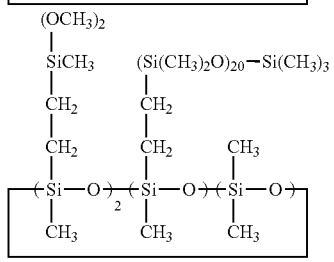
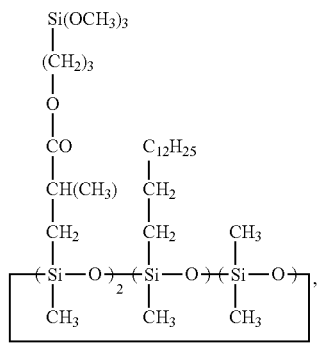
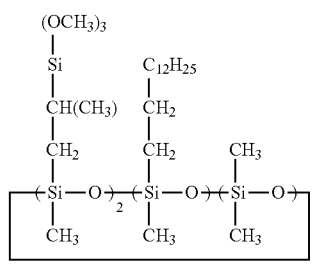

As further preferred examples of the siloxane compounds, there can be mentioned compounds represented by the structural formulae shown below.

[Chemical Formula 9]

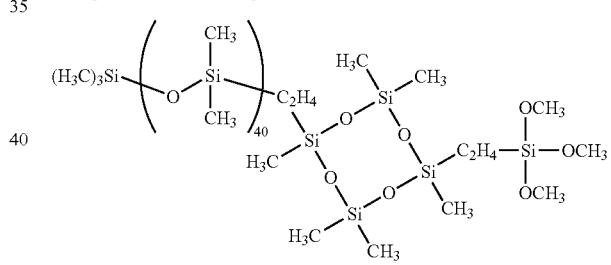
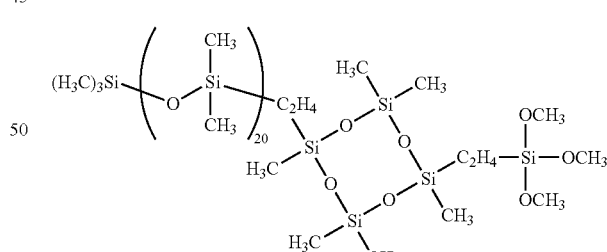
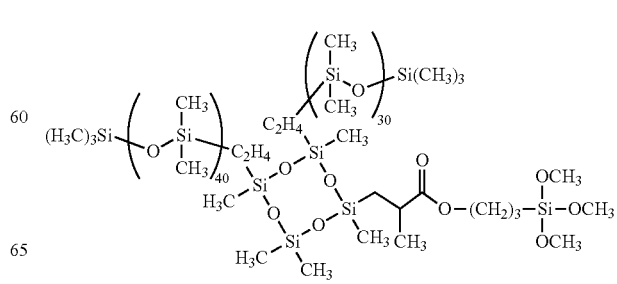

-continued

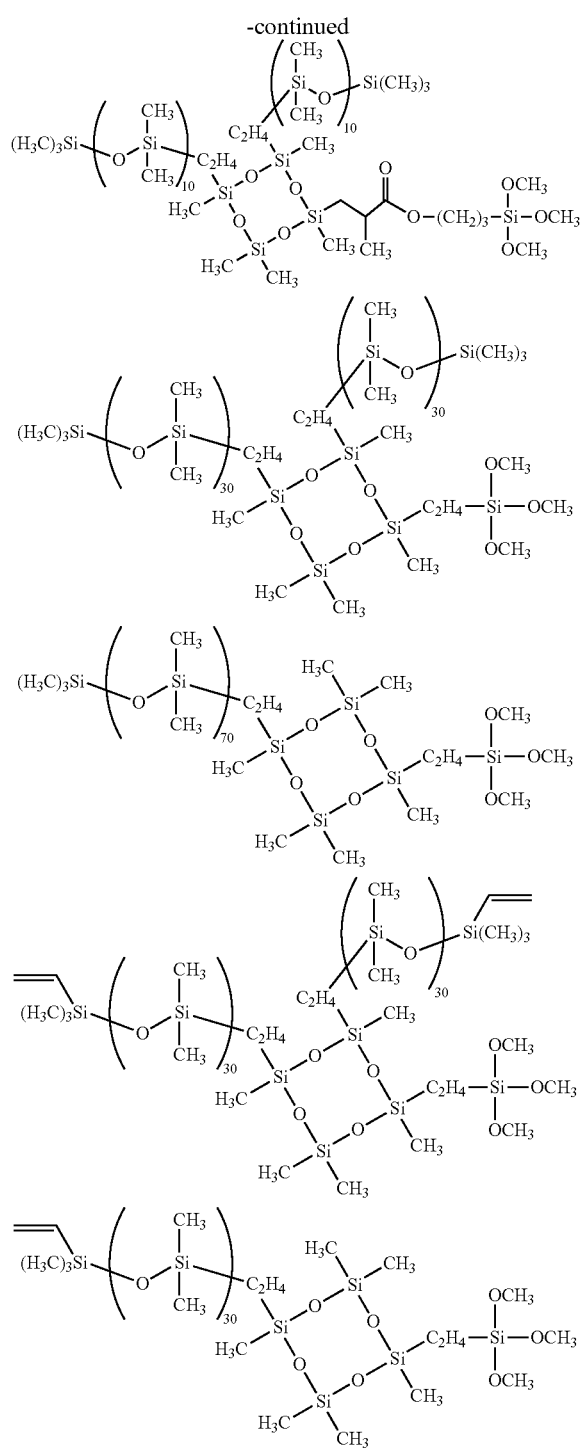

In the description of the structure of the siloxane compound, the structural units of the siloxane compound are frequently indicated using the abbreviations shown below (hereinafter, these structural units are frequently respectively referred to as, for example, "M unit" and "D unit").

M: —Si(CH$_3$)$_3$O$_{1/2}$
M$^H$: —SiH(CH$_3$)$_2$O$_{1/2}$
M$^{Vi}$: —Si(CH=CH$_2$)(CH$_3$)$_2$O$_{1/2}$
D: Si(CH$_3$)$_2$O$_{2/2}$
D$^H$: SiH(CH$_3$)O$_{2/2}$
T: Si(CH$_3$)O$_{3/2}$
Q: SiO$_{4/2}$

For example, the structure of the general formula (4) above wherein $R^4$ is a methyl group and Y is a vinyl group is indicated by -D$_n$M$^{Vi}$. In this connection, it is noted that, for example, when a structure is indicated by D$^H_{20}$D$_{20}$, it is understood that the indication is not intended to show that 20 D$^H$ units are continuously disposed and then 20 D units are continuously disposed, but shows that the individual units may be arbitrarily arranged.

The amount of the incorporated siloxane compound as a surface treatment agent is in the range of from 0.01 to 20 parts by mass, relative to 100 parts by mass of the thermally conductive filler. When the amount of the siloxane compound is in this range, the thermal conductivity can be increased while increasing the filling property of the thermally conductive filler. The amount of the siloxane compound incorporated is more preferably in the range of from 0.1 to 15 parts by mass. Further, 0.01 part by mass or more of the siloxane compound is preferably used, relative to 100 parts by mass of the polysiloxane resin having a curable functional group. When the amount of the siloxane compound relative to the polysiloxane resin is less than 0.01 part by mass, the surface treatment effect for the thermally conductive filler is reduced, making high incorporation difficult. When the amount of the siloxane compound is too large, the mechanical physical properties and heat resistance of the composition after cured are adversely affected, and therefore the amount of the siloxane compound is more preferably in the range of from 0.1 to 500 parts by mass.

[(D) Hydrogenpolyorganosiloxane]

In the polysiloxane composition, for curing the composition, a hydrogenpolyorganosiloxane which is a siloxane containing a hydrogen group is added. The hydrogenpolyorganosiloxane is a siloxane compound having a Si—H bond, which is a component that serves as a crosslinking agent. Two or more hydrogenpolyorganosiloxanes may be used in combination. The hydrogenpolyorganosiloxane representatively has in the molecule thereof two or more units represented by the following general formula (5):

$$(R^b)_x(R^c)_y SiO_{(4-x-y)/2} \qquad (5)$$

wherein:
R$^b$ is a hydrogen atom;
R$^c$ is a C$_{1-6}$ alkyl group (for example, methyl, ethyl, propyl, butyl, pentyl, or hexyl, preferably methyl) or a phenyl group;
x is 1 or 2; and
y is an integer of 0 to 2, with the proviso that x+y is 1 to 3.

Examples of siloxane skeletons in the hydrogenpolyorganosiloxane include those which are cyclic, branched, or linear, and preferred is a cyclic or linear skeleton, and more preferred is a linear skeleton. The main chain of the hydrogenpolyorganosiloxane is preferably of a linear skeleton, but may be of a skeleton having a branched structure as a substituent. Further, it is necessary that the number of hydrogen groups bonded to the silicon atom contained per molecule (i.e., specifically, Si—H bonds) be at least 3 or more, but an average of the number of above hydrogen groups per molecule is preferably 5 or more, more preferably 8 or more. In the hydrogenpolyorganosiloxane, with respect to the other conditions, organic groups other than a hydrogen group, bonding position, polymerization degree, structure and others, there is no particular limitation, but, when the hydrogenpolyorganosiloxane has a linear structure, the polymerization degree is preferably in the range of from 10 to 100, especially preferably 15 to 70, because the obtained composition is likely further improved in the handling properties. Specific examples of the usable hydrogenpolyorganosiloxanes include a hydrogenpolyorganosiloxane having a linear skeleton which contains 8 or more units ($M^H$ or $D^H$ units) having a Si—H bond, and which has a polymerization degree in the range of from 15 to 70.

The amount of the hydrogenpolyorganosiloxane incorporated is preferably an amount such that the number of the hydrogen atoms directly bonded to a silicon atom becomes 0.7 to 5.0, relative to one curable functional group of component (B), particularly one unsaturated bond, such as a vinyl group. When the number of the hydrogen atoms is less than 0.7, it is likely that curing does not proceed at a satisfactory rate, and, when the number of the hydrogen atoms is more than 5.0, it is likely that the resultant cured product becomes too hard, and further the physical properties of the composition after cured are adversely affected. When the curable functional group is a vinyl group, the amount of the polyorganosiloxane having one vinyl group in the molecule thereof can also be controlled by appropriately selecting the mass ratio (H/Vi ratio) of the Si—H bond in the hydrogenpolyorganosiloxane to the unsaturated bond, particularly a vinyl group. The H/Vi ratio is preferably in the range of from 0.7 to 2.0, more preferably in the range of from 0.8 to 1.5. When the H/Vi ratio is 0.7 or more, curing at a satisfactory rate can be achieved, and excessive bleeding can be suppressed. Further, when the H/Vi ratio is 2.0 or less, the composition is cured using a satisfactory amount of the polyorganosiloxane, making it possible to maintain an appropriate hardness.

[(E) Platinum Catalyst]

The platinum catalyst is a curing catalyst used for reacting the curable functional group of component (B) including a vinyl group with a hydrogen group of component (D) to obtain a cured product. Examples of such platinum compounds include chloroplatinic acid, a platinum-olefin complex, a platinum-vinylsiloxane complex, a platinum-phosphorus complex, a platinum-alcohol complex, and platinum black. The amount of the platinum catalyst incorporated is 0.1 to 1,000 ppm, in terms of a platinum element, based on component (B). When the amount of the platinum catalyst is less than 0.1 ppm, curing does not satisfactorily proceed, and, even when the amount of the platinum catalyst is more than 1,000 ppm, an improvement of the curing rate cannot particularly be expected. Depending on the use of the composition, for obtaining a longer pot life, the activity of the catalyst can be suppressed by adding a reaction inhibitor. Examples of known reaction inhibitors for metals of the platinum group include acetylenic alcohols, such as 2-methyl-3-butyn-2-ol and 1-ethynyl-2-cyclohexanol, and diallyl maleate.

As a method for preparing the composition of the present invention, the composition can be prepared by, for example, mixing together the above-mentioned components (A) to (E) at the same time, or by first blending the components (A) to (C) to prepare a resin composition, and then adding a mixture of components (D) and (E) to the resin composition immediately before curing the composition. The resin composition having blended components (A) to (C) may be prepared by mixing together the siloxane compound, polyorganosiloxane resin, and thermally conductive filler as such using a kneading machine, or by first mixing the siloxane compound and thermally conductive filler to subject the filler to surface treatment, and then dispersing the resultant mixture in the polyorganosiloxane resin. As a kneading method, a known means and apparatus can be used. Further, if necessary, the composition may be subjected to treatment by heating, under a reduced pressure, or by another known method.

In the thermally conductive polysiloxane composition of the present invention, if necessary, a pigment, a flame retardant, a tackifier, a heat resistance imparting agent, a diluent, or an organic solvent and others, which have been known to those skilled in the art, can be appropriately incorporated in such an amount that the effects of the present invention are not sacrificed.

With respect to the thermally conductive polysiloxane composition of the present invention, a cured product, such as a silicone rubber, can be obtained by curing the curable functional group of the polysiloxane resin. The curing reaction for the polysiloxane composition can be conducted by a method appropriately selected according to the type of the curable functional group of the polysiloxane resin. The thermally conductive polysiloxane composition can be cured by applying heat to the composition, and one of the remarkable effects of the present invention is such that heat curing of the composition is completed in a short time. The conditions for heat curing are known to those skilled in the art, and, as examples of apparatuses which can be used in a curing reaction caused due to heat, there can be mentioned apparatuses known to those skilled in the art, such as a constant temperature bath. The heating conditions can be appropriately selected according to the heat resistance temperature of a member to which the thermally conductive polysiloxane composition is applied, and the curing time can be determined.

A cured product obtained by curing the thermally conductive polysiloxane composition of the present invention can be used as a radiator member for electronic devices and electronic parts, such as an integrated circuit element.

EXAMPLES

Hereinbelow, the present invention will be described with reference to the following Examples, which should not be construed as limiting the scope of the present invention. In the following Examples and Comparative Examples, the "part(s)" indicates part(s) by mass.

The materials used in the following Examples and Comparative Examples are shown below.

<(A) Thermally Conductive Filler>

Aluminum nitride having an average particle diameter of 60 μm (Indefinite shape; TFZ-N60P, manufactured by Toyo Aluminum K.K.)

Aluminum nitride having an average particle diameter of 28 μm (Indefinite shape; TFZ-N30P, manufactured by Toyo Aluminum K.K.)

Aluminum oxide having an average particle diameter of 3 μm (Rounded shape; Sumicorundum AA-3, manufactured by Sumitomo Chemical Co., Ltd.)

Aluminum oxide having an average particle diameter of 75 μm (Spherical shape; AX75-150, manufactured by Nippon Steel & Sumikin Materials Co., Ltd.)

Aluminum oxide having an average particle diameter of 9 μm (Rounded shape; AS-50, manufactured by Showa Denko K.K.)

Aluminum oxide having an average particle diameter of 0.4 μm (Rounded shape; Sumicorundum AA-04, manufactured by Sumitomo Chemical Co., Ltd.)

<(B) Polyorganosiloxane Resin>
(Polysiloxane Having One Vinyl Group)

$M^{Vi}D_{20}M$ (Linear one-end vinylsiloxane in which the number of D units is 20)

$M^{Vi}D_{30}M$ (Linear one-end vinylsiloxane in which the number of D units is 30)

$M^{Vi}D_{50}M$ (Linear one-end vinylsiloxane in which the number of D units is 50) (Polysiloxane having two vinyl groups)

(1) α,ω-Divinylpolydimethylsiloxane having a viscosity of 30 cP (2) α,ω-Divinylpolydimethylsiloxane having a viscosity of 100 cP <(C) Siloxane Compound (Surface Treatment Agent)>

Surface treatment agent 1: Siloxane represented by the following chemical formula:

[Chemical formula 10]

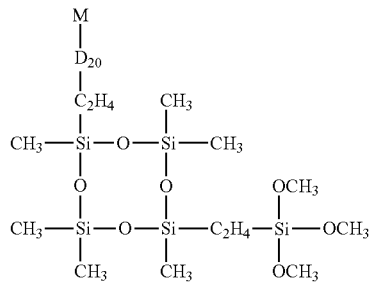

wherein M is an M unit as defined above, and D is a D unit as defined above.

<(D) Hydroxyl Group-Containing Polyorganosiloxane>

(1) Methylhydrogenpolysiloxane represented by $M^H{}_8D^H{}_{42}M^H$ (2) Methylhydrogenpolysiloxane represented by $M^H D_{20} M^H$ (3) Cyclic methylhydrogenpolysiloxane represented by $M^H{}_8 Q_4$ <(E) Platinum Catalyst>

Pt-$D^{Vi}{}_4$ complex (Tetravinyltetramethylcyclotetrasiloxane complex of platinum)

Further, as a reaction inhibitor, 1-ethynyl-1-cyclohexanol was used.

Examples 1 to 5 and Comparative Examples 1 and 2

<Preparation of a Thermally Conductive Polysiloxane Composition>

Components (A) to (C) in the respective amounts shown in Table 1 below were kneaded using a planetary mixer by a predetermined method to obtain a thermally conductive polysiloxane composition. Then, to the obtained thermally conductive polysiloxane composition were added the above-mentioned platinum-vinylsiloxane complex catalyst as platinum catalyst (E) and an inhibitor in such amounts that the catalyst concentration became 5.0 ppm in terms of a platinum atom and the inhibitor concentration became 35 ppm, and the resultant mixture was kneaded using a planetary mixer by a predetermined method. Further, methylhydrogenpolysiloxane (D) in the predetermined amount was mixed and the resultant mixture was kneaded using a planetary mixer by a predetermined method, obtaining thermally conductive polysiloxane compositions in Examples 1 to 5 and Comparative Examples 1 and 2. With respect to the obtained compositions, a viscosity at 23° C. was measured at 2 rpm for 5 minutes in accordance with JIS K6249 using a rotational viscometer (Vismetron VDH) (manufactured by Shibaura System Co., Ltd.) and using a No. 7 rotor. The results of the measurement of viscosity are shown in Table 1.

<Measurement of a Hardness>

A thermally conductive polysiloxane composition was poured into a mold being made of aluminum coated with Teflon (registered trademark) and having an internal dimension of 6 mm (depth)×60 mm (length)×30 mm (width), and cured using a hot-air circulating dryer at 70° C. for one hour. The cured product was cooled to 23° C., and then a Type E hardness was measured in accordance with JIS K6249. The results are shown in Table 1 below. Then, the resultant cured product was further treated at 70° C. for one hour, and the resultant cured product was cooled to 23° C., and then a Type E hardness was similarly measured.

<Measurement of a Thermal Conductivity>

Using a thermal conductivity meter (TPS 1500) (manufactured by Kyoto Electronics Manufacturing Co., Ltd.), a thermal conductivity was measured by disposing the sensor of the thermal conductivity meter between two samples which were prepared under curing conditions at 70° C. for one hour using a mold being made of aluminum coated with Teflon (registered trademark) and having an internal dimension of 6 mm (depth)×30 mm (length)×30 mm (width). The unit of a thermal conductivity is W/mK.

TABLE 1

| | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| A | Aluminum nitride having an average particle diameter of 60 μm | 44.86 | 44.86 | 44.86 | 44.86 | | | 44.86 | | 44.86 |
| | Aluminum nitride having an average particle diameter of 28 μm | | | | | | 44.86 | | | |
| | Aluminum oxide having an average particle diameter of 3 μm | 31.30 | 31.30 | 31.30 | 31.30 | | 31.30 | 31.30 | | 31.30 |
| | Aluminum oxide having an average particle diameter of 75 μm | | | | | 56.6 | | | 56.6 | |
| | Aluminum oxide having an average particle diameter of 9 μm | | | | | 23.6 | | | 23.6 | |
| | Aluminum oxide having an average particle diameter of 0.4 μm | 18.26 | 18.26 | 18.26 | 18.26 | 14.2 | 18.26 | 18.26 | 14.2 | 18.26 |
| B | $M^{vi}D_{20}M$ | | | 3.07 | | | | | | |
| | $M^{vi}D_{30}M$ | 3.24 | 3.08 | | | 2.90 | 3.04 | 2.40 | 0.00 | 2.65 |
| | $M^{vi}D_{50}M$ | | | | 3.53 | | | | | |
| | Both-end vinylpolysiloxane having a viscosity of 30 cP | | | | | | | 1.20 | 270 | |

TABLE 1-continued

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
|  | Both-end vinylpolysiloxane having a viscosity of 100 cP | 0.22 | 0.50 | 0.22 | 0.22 | 0.35 | 0.62 |  | 0.35 | 0.84 |
| C | Surface treatment agent | 1.50 | 1.50 | 1.50 | 1.50 | 1.89 | 1.50 | 1.50 | 1.89 | 1.50 |
| D | $M^H D^H{}_8 D_{42} M^H$ | 0.59 | 0.47 | 0.76 | 0.30 | 0.47 | 0.42 | 0.45 |  | 0.59 |
|  | $M^H D_{20} M^H$ |  |  |  |  |  |  |  | 0.59 |  |
|  | $M^H{}_8 Q_4$ |  |  |  |  |  |  |  | 0.08 |  |
| Compositional ratio | One-end Vi oil amount [wt %] | 94% | 86% | 93% | 94% | 89% | 83% | 67% | 0% | 76% |
|  | H/Vi | 1.03 | 0.82 | 1.12 | 0.83 | 0.89 | 0.73 | 0.54 | 0.56 | 1.11 |
| Physical property value | Viscosity [Pa.s] | 400 | 580 | 480 | 730 | 360 | 810 | 460 | 380 | 600 |
|  | Hardness [Type E] 70° C./1 h | 45 | 45 | 31 | 60 | 24 | 59 | 64 | 53 | 81 |
|  | Hardness [Type E] 70° C./2 h | 45 | 47 | 31 | 61 | 25 | 62 | 70 | 64 | 85 |
|  | Change of hardness | 0 | 2 | 0 | 1 | 1 | 3 | 6 | 11 | 4 |
|  | Thermal conductivity | 9.4 | 9.4 | 9.4 | 9.1 | 6.2 | 9.3 | 9.0 | 6.1 | 10.3 |

In all the Examples and Comparative Examples, the thermally conductive polysiloxane composition maintained a viscosity such that the composition is easy to handle. Table 1 shows that when the amount of the contained vinylsiloxane, which corresponds to component (b1), is the predetermined amount or more, curing is substantially completed at a point in time of one-hour heating, which indicates that the polysiloxane composition has excellent curing rate. Further, it is understood that this tendency occurs regardless of the type of the thermally conductive filler used, and does not affect the thermal conductivity. On the other hand, in Comparative Examples 1 to 3 in which the amount of component (b1) is smaller, the hardness obtained at a point in time of two-hour heating was totally different from the hardness obtained at a point in time of one-hour heating, and thus a satisfactory curing rate could not be obtained, as compared to that in the Examples. Particularly, with respect to Example 1 and Comparative Example 3 in which, by controlling the amount of the polysiloxane, the amount of component (b1) is changed while maintaining the substantially consistent H/Vi ratio in the composition, a comparison made between these examples shows that there is a large difference in the curing rate. Further, there is a large difference in the hardness of the composition between Example 1 and Comparative Example 3. The thermally conductive polysiloxane composition is required to have appropriate elastic properties after being cured, and the above-mentioned comparisons between the examples show that more advantageous physical properties can be achieved by virtue of the formulation of the composition of the present invention. Further, it is considered that the thermally conductive filler having a smaller particle diameter generally tends to increase the viscosity of the resultant composition, and hence causes a uniform curing reaction to be slow, but, even in such a system, the composition having component (b1) added exhibits a satisfactory curing rate (Example 6).

INDUSTRIAL APPLICABILITY

The thermally conductive polysiloxane composition of the present invention not only exhibits a thermal conductivity basically required but also has a viscosity such that the composition is easy to handle and a high curing rate, and thus has excellent handling properties. Therefore, the cured product obtained from the composition can be effectively widely used as a radiator member for various electronic devices and electronic parts, such as an integrated circuit element.

The invention claimed is:

1. A thermally conductive polysiloxane composition comprising:
   (A) a thermally conductive filler;
   (B) a mixture of:
      (i) a polyorganosiloxane containing one curable group, the polyorganosiloxane containing one curable group being represented by the following formula (1):

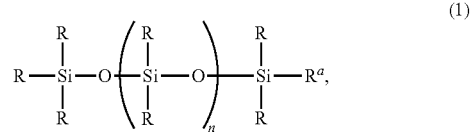

wherein $R^a$ is the curable group, each R is independently a $C_{1-6}$ alkyl group or a $C_{6-12}$ aryl group, and n is an integer of 20 to 50, and
      (ii) a polyorganosiloxane containing more than one curable group,
   wherein a content of the (i) polyorganosiloxane containing one curable group in the mixture (B) is more than 80% by mass;
   (C) a siloxane compound represented by the following formula (3):

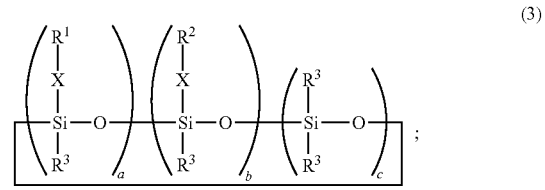

wherein:
   $R^1$ is a group having an alkoxysilyl group having 1 to 4 carbon atoms;
   $R^2$ is a linear organosiloxy group represented by the following formula (4):

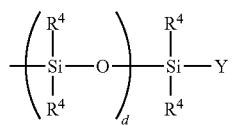 (4)

each R⁴ is independently a monovalent hydrocarbon group having 1 to 12 carbon atoms;
Y is a group selected from the group consisting of methyl, vinyl, and R¹,
d is an integer of 2 to 60;
each X is independently a divalent hydrocarbon group having 2 to 10 carbon atoms;
each of a and b is independently an integer of 1 or more;
c is an integer of 0 or more;
a+b+c is an integer of 4 or more; and
each R³ is independently a monovalent hydrocarbon group having 1 to 6 carbon atoms or a hydrogen atom;
(D) a hydrogenpolyorganosiloxane; and
(E) a platinum catalyst.

2. The thermally conductive polysiloxane composition according to claim 1, wherein the curable functional group in the component (B) is a vinyl group.

3. The thermally conductive polysiloxane composition according to claim 2, wherein the mass ratio of the hydrogen directly bonded to silicon to the vinyl group contained in the composition (H/Vi ratio) is in the range of from 0.7 to 2.0.

4. A cured product of the thermally conductive polysiloxane composition according to claim 1.

5. An electronic part comprising the cured product according to claim 4.

* * * * *